US011663373B1

(12) United States Patent
Chalavadi

(10) Patent No.: US 11,663,373 B1
(45) Date of Patent: May 30, 2023

(54) SYSTEMS AND METHODS FOR SIMULATING DISTORTION AND RESIDUAL STRESS IN AN ADDITIVE MANUFACTURING PROCESS

(71) Applicant: Ansys, Inc., Canonsburg, PA (US)

(72) Inventor: Pradeep Kumar Chalavadi, Salt Lake City, UT (US)

(73) Assignee: Ansys, Inc., Canonsburg, PA (US)

( * ) Notice: Subject to any disclaimer, the term of this patent is extended or adjusted under 35 U.S.C. 154(b) by 950 days.

(21) Appl. No.: 16/456,086

(22) Filed: Jun. 28, 2019

Related U.S. Application Data

(60) Provisional application No. 62/691,677, filed on Jun. 29, 2018.

(51) Int. Cl.
*G06F 30/00* (2020.01)
*B23K 26/342* (2014.01)
*B33Y 50/00* (2015.01)

(52) U.S. Cl.
CPC ............ *G06F 30/00* (2020.01); *B23K 26/342* (2015.10); *B33Y 50/00* (2014.12)

(58) Field of Classification Search
CPC ........ G06F 30/00; B23K 26/342; B33Y 50/00
See application file for complete search history.

(56) References Cited

U.S. PATENT DOCUMENTS

2016/0292902 A1* 10/2016 Milne .................... G06T 13/00
2020/0285710 A1*  9/2020 Chen ..................... G06F 30/28

* cited by examiner

*Primary Examiner* — Bijan Mapar
(74) *Attorney, Agent, or Firm* — Jones Day

(57) ABSTRACT

Example systems and methods are disclosed for predicting structural distortion in a part geometry created by an additive manufacturing process. An octree mesh is generated for a part geometry based on a voxel file having voxel layers. The octree mesh is coarsened, a representation of stiffness for one of the voxel layers is generated based on the coarsened octree mesh, a force vector is determined based, in part, on the coarsened octree mesh and data from a thermal analysis of the part geometry, and a layer distortion is determined based, in part, on the force vector and the representation of stiffness. The structural distortion in the part geometry is predicted based on the layer distortion.

20 Claims, 14 Drawing Sheets

SYSTEMS AND METHODS FOR SIMULATING DISTORTION AND RESIDUAL STRESS IN AN ADDITIVE MANUFACTURING PROCESS

This application claims priority to U.S. Provisional Application No. 62/691,677 filed on Jun. 29, 2018, titled "Systems and Methods for Simulating Distortion and Residual Stress in an Additive Manufacturing Process," the entirety of which is herein incorporated by reference.

TECHNICAL FIELD

The technology described herein relates generally to computer-aided design (CAD) tools and more particularly to systems and methods for performing a simulation and structural analysis of an additive manufacturing process.

BACKGROUND

FIG. 1 is a diagram depicting an example additive manufacturing (e.g., 3D printing) process that utilizes a laser beam melting (LBM) technique. LBM additive manufacturing is commonly used to produce metal parts from a metallic powder. A typical LBM additive manufacturing system 100, as shown in FIG. 1, includes a laser emitting device 102 and a powder deposition device 104 that are controlled by a computer system (not shown) based, for example, on a computer-aided design (CAD) file, to generate a solid geometry 106 from a metallic powder (referred to as the powder feedstock). In operation, the solid geometry 106 is created by patterning a layer of the powder feedstock using the powder deposition device 104, melting the powder layer with a beam emitted by the laser emitting device 102, allowing the melted layer to cool into a solid, and repeating the process to build the solid geometry 106, layer-by-layer. In existing additive manufacturing systems, the resultant solid geometry 106 created using an LBM (or other similar) process is often distorted in comparison to the intended design as a result of thermal stresses caused by the rapid heating and cooling process.

SUMMARY

Example systems and methods are disclosed for predicting structural distortion in a part geometry created by an additive manufacturing process. An octree mesh is generated for a part geometry based on a voxel file having voxel layers. Parts of the octree mesh may be used to simulate material deposition layer by layer. In one example, after each layer deposition, the octree mesh is coarsened, a representation of stiffness for one of the voxel layers is generated based on the coarsened octree mesh, a force vector is determined based, in part, on the coarsened octree mesh and data from a thermal analysis of the part geometry, and a layer distortion is determined based, in part, on the force vector and the representation of stiffness. The structural distortion in the part geometry is predicted based on the layer distortion.

DETAILED DESCRIPTION

Figure 1:
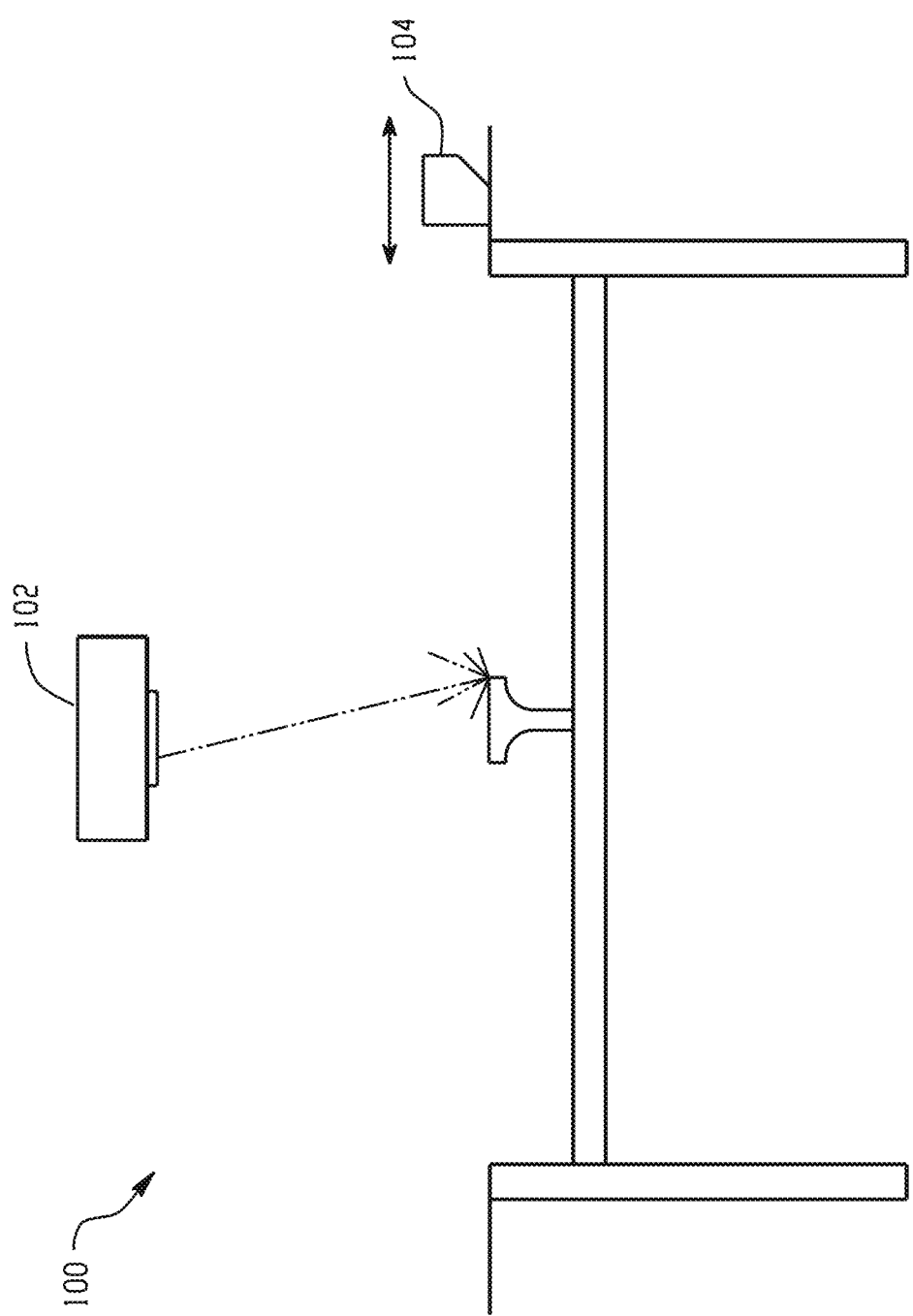
FIG. 1 is a diagram depicting an example additive manufacturing process.
Figure 2:
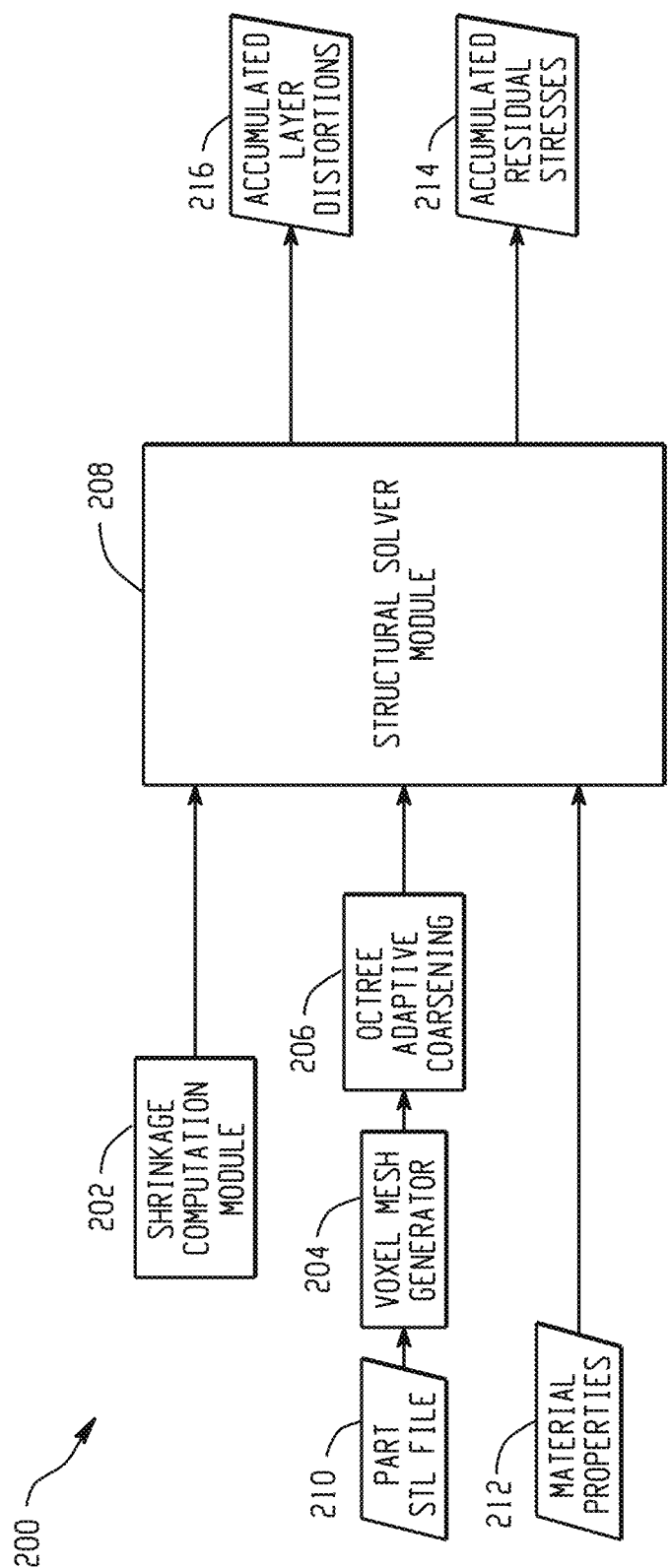
FIG. 2 is a block diagram of an example system for performing a simulation and structural analysis of an additive manufacturing process.

FIG. 2 is a block diagram of an example system 200 for performing a simulation and structural analysis of an additive manufacturing process. The system 200 may, for example, be used to simulate and analyze the distortion and residual stress in a solid geometry created using the LBM additive manufacturing process shown in FIG. 1. The example system 200 shown in FIG. 2 includes a shrinkage computation module 202, a voxel mesh generator 204, an octree adaptive coarsening module 206, and a structural solver module 208, each of which may, for example, be implemented using software stored on one or more non-transitory computer-readable medium and executed by one or more processor.

The system 200 depicted in FIG. 2 may, for example, be utilized to simulate the structural evolution of additive manufactured geometric parts using spatio-temporal data generated from a thermal analysis performed by the shrinkage computation module 202. The shrinkage computation module 202 may, for example, perform a temperature evaluation to predict shrinkage in the material at locations (e.g., voxels) in the part geometry based on temperature changes caused by rapid heating and cooling during the additive manufacturing process. An example of systems and methods that may be used to implement the shrinkage computation module 202 are described in commonly-owned U.S. Provisional Patent Application No. 62/586,793, titled "Systems and Methods for Performing Thermal Solving for Simulation and Implementation of Additive Manufacturing Process," which is incorporated herein by reference. As further detailed below, the analysis performed by the illustrated system 200 may include the calculation of dynamic distortion and residual stresses generated because of rapid heating and cooling. The structural solver module 208 may, for example, utilize finite element analysis methods (as detailed below) to reduce the computations by using problem-specific global stiffness assembly methods. The structural solver module 208 may, for example, also use an intelligent guess in iterative methods for solving successive layer solutions.

In addition to the thermal analysis (e.g., shrinkage) output from the shrinkage computation module 202, the structural solver module 208 also receives a computer-aided design file 210 (e.g., an "STL file" generated by stereolithography CAD software) that is voxelized and coarsened using the voxel mesh generator 204 and octree adaptive coarsening module 206, and material properties data 212 that identifies properties of the materials used in the additive manufacturing process to be simulated (such as properties of the powder feedstock, etc.) The computer-aided design file 210 and the material properties data 212 may, for example, be input using one or more user interfaces to the system 200.

The voxel mesh generator 204 receives the computer-aided design file 210 that describes a desired part geometry to be created using the additive manufacturing process. The part geometry is voxelized by the voxel mesh generator 204, for example using a known method such as described by Sun K., et al., *Voxelization Algorithm Based on STL Model*, Human Centered Computing, HCC 2016, Lecture Notes in Computer Science, vol. 9567, pp. 913-918, Springer, Cham (2016). In addition, the voxel mesh generator 204 may add one or more support structures to the part geometry, as necessary. For example, bottom facing voxels that have a surface angle of less than 45% may be extruded to the base to create support voxels to improve the structural stability of the part geometry. The part voxels, including any added support voxels, may be stored with proper annotations into a voxel file. The voxel file may then be read into a mechanics solver and converted into a hexahedral finite element conformal mesh.

The voxel file generated by the voxel mesh generator 204 provides a uniform grid of elements for the part geometry. However, a simulation and structural analysis performed using the uniform grid of elements from the voxel mesh generator 204 would typically involve solving many millions of degrees of freedom. The octree adaptive coarsening module 206 may therefore be used to coarsen the elements of the geometry by combining certain elements to create larger elements. In this process, the number of degrees of freedom may be reduced by many orders. The domain of coarsening may, for example, be determined by an a priori error estimate, with the coarsening performed in the area where the error is lower than a given threshold. For instance, the $L_2$ norm of the stress($\sigma$) error (e) may be expressed as:

$$\|e\|_{L_2} = [\int_\Omega (\sigma - \hat{\sigma})^T (\sigma - \hat{\sigma}) d\Omega]^{1/2},$$

where $L_2$ is Euclidean norm, $\sigma$ is internal stresses, e is error, and $\Omega$ is domain of computation.

An octree-based meshing algorithm may be used to define the data structure of the initial mesh. An octree-based meshing algorithm is amenable to modifications necessary to perform the desired coarsening. As understood by persons skilled in the art, an octree is a hierarchical data structure that may be used to span an entire geometry in a few tree levels. The bounding box of the geometry is considered the root, and is divided into 8 octants. Each octant is checked for intersecting voxels, with the process being carried out recursively working down all sub-branches of the tree until a single voxel belongs to a given octant.

Figure 3C:
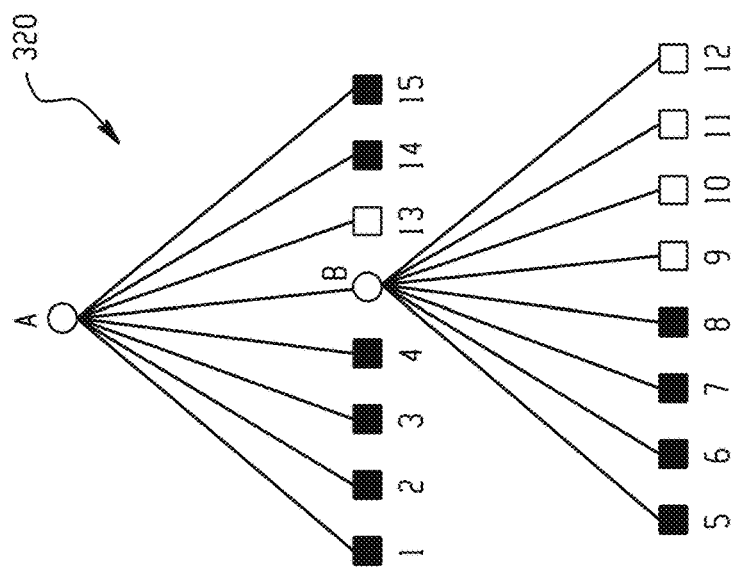
FIG. 3A-3C are diagrams depicting the creation of an example octree data structure.
Figure 3B:
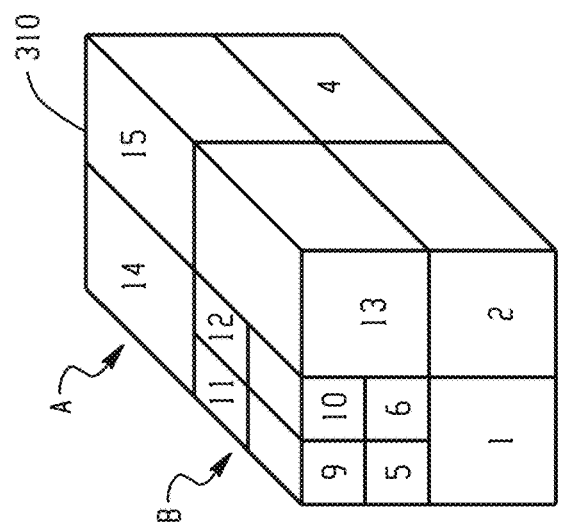
Figure 3A:
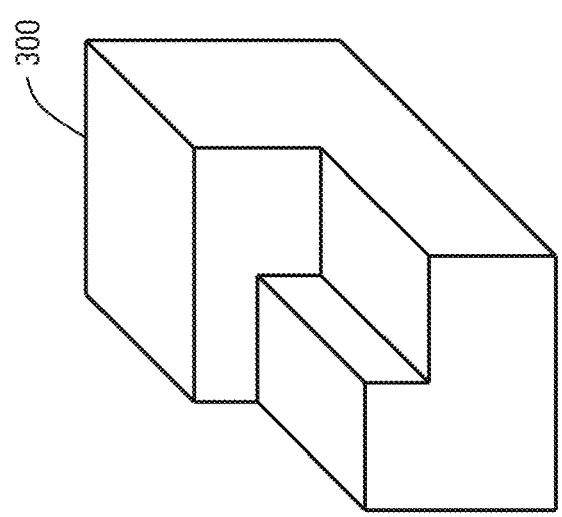

FIG. 3A-3C are diagrams depicting the creation of an example octree data structure. FIG. 3A shows an example geometry 300 from which to create the octree data structure. The geometry 300 is partitioned into a subdivided octant representation 310, as shown in FIG. 3B. As illustrated, the bounding box (A) of the geometry (including any empty space within the bounding box) is first subdivided into 8 octants, which are labeled in the illustrated example as 1, 2, 3 (not visible in FIG. 3B), 4, 13, 14 and 15. Any of the resulting octants that are not either completely solid or completely empty are further subdivided into 8 more octants, and so-on until each octant is uniform. For instance, in the illustrated example 310, the first-level octant (B) is subdivided into second-level octants 5, 6, 7, (not visible), 8 (not visible), 9, 10, 11 and 12. A tree diagram 320 may then be created for the geometry, as shown in FIG. 3C. The lowest octants in the tree structure are called the "leaves." For instance, in the example shown in FIG. 3A, the "leaves" include the octants labeled 1-12 (but not nodes A or B.)

Figure 4:
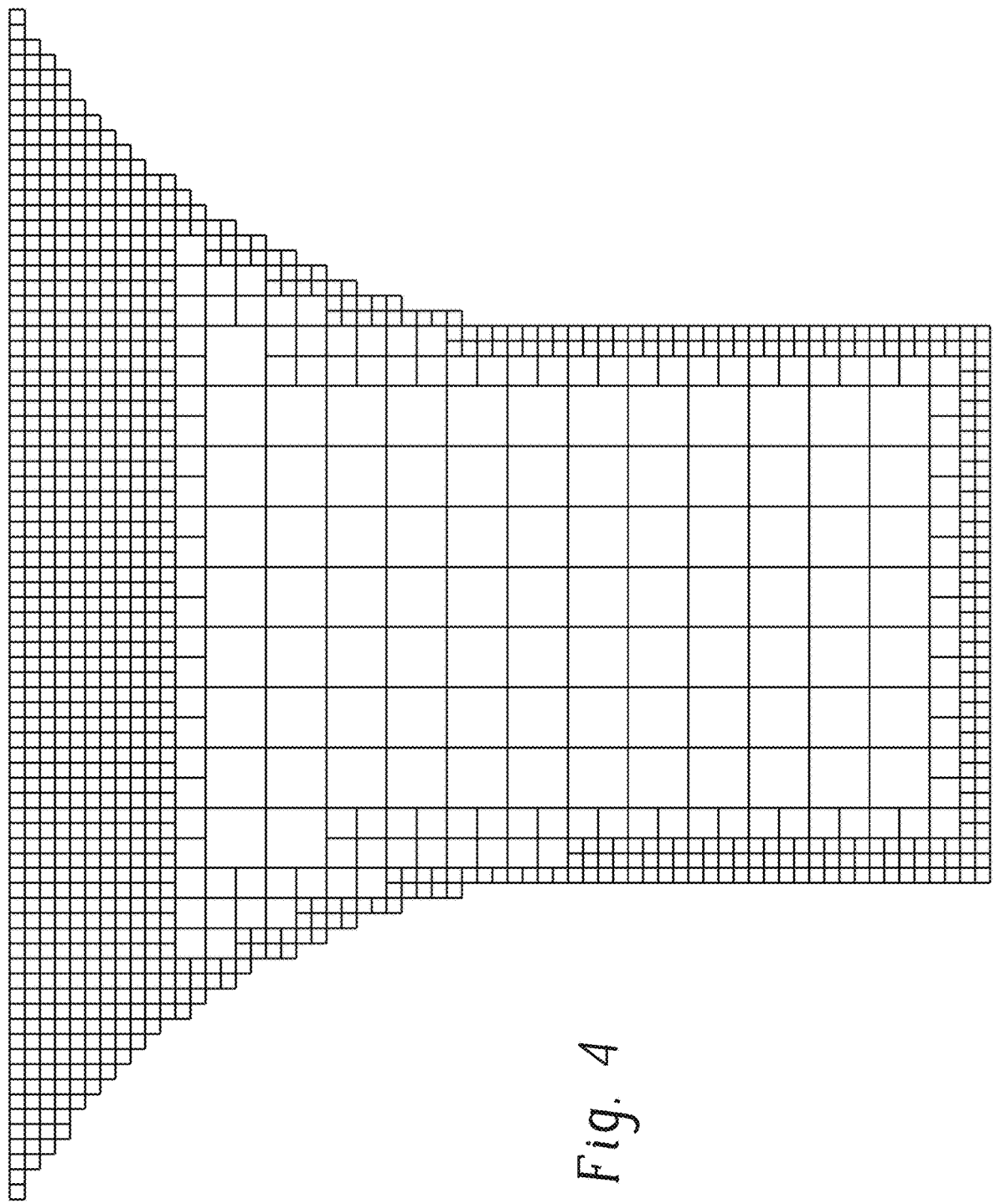
FIG. 4 is a diagram depicting an example of a coarsened mesh for a geometry.

With reference again to FIG. 2, the octree adaptive coarsening module 206 may be configured to assign a set of arrays to the leaves and octants at different levels of the tree with information related to the finite element mesh, such as coordinate indexes of the corners, element type labels, a flag which can be updated to indicate a given element is allowed to be coarsened, and/or a flag to indicate whether a given element is active or inactive. The resultant data structure may then be used to conditionally coarsen the part geometry in the prescribed subdomains based on the criteria set. In this manner, further processing of the part geometry by the structural solver module 208 may be improved, allowing quicker traversal to the required area of interest by eliminating one half of the domain as the process traverses down the tree in search of the required domain. One example of a part geometry that has been coarsened using the octree adaptive coarsening method is shown in FIG. 4 (note that FIG. 4 shows a 2-dimensional representation of a 3-dimensional part.) It can be seen in the example of FIG. 4 that part of the volume is coarser compared to the other parts. The smallest sized voxels that are seen have the original voxel size, whereas the further bigger voxels have been obtained from the conditional coarsening process described herein.

With reference again to FIG. 2, the structural solver module 208 performs a simulation-based analysis to predict the accumulated layer distortions 216 and accumulated residual stresses 214 that will result when creating the part geometry identified in the part file 210 using an additive manufacturing process. The parameters of the simulated additive manufacturing process are defined by the thermal analysis output of the shrinkage computation module 202 and the material properties data 212.

The structural solver module 208 employs a problem-specific process that aims to solve a layer-by-layer process paradigm in additive manufacturing. As detailed above, a certain number of physical layers of the additive manufactured part are combined into a voxel layer and the shrinkage resulting from the thermal expansion and the succeeding cooling (as determined by the shrinkage computation module 202) is forced on the top layer. This creates internal stress between the top layer and layers below the top layer, which is a complicated phenomenon that can be described in a set of partial differential equations that may be solved by the structural solver module 208 for the distortion and residual stresses at the mesh nodes. Examples of the set of partial differential equations solved by the structural solver module 208 are set forth below: Equilibrium Equation: $\nabla \sigma + b = 0$, $\sigma$: internal stresses, b: body forces; Strain Displacement Equation:

$$\varepsilon = \frac{1}{2}(\nabla u^T + \nabla u),$$

ε: engineering strain, u: distortion; Constitutive Equation: σ=Cε, C: material constitutive matrix The above equations may be solved by the structural solver module 208 using variational principles to reduce the equations into an integral form with continuous functions and subsequently into discrete functions with a final form as shown below.

$$\hat{\varepsilon} = \overline{B}\hat{u}, \overline{B}\text{: strain–displacement matrix; }\hat{u}\text{: nodal displacements.}$$

$$KE = \int_\Omega \overline{B}^T C\overline{B}\, dV, \text{ Element Stiffness Matrix}$$

$$f^{(e)} = \int_\Omega \overline{B}^T C\varepsilon_{thermal}, f^{(e)}\text{: force vector; }\varepsilon_{thermal}\text{: thermal strain}$$

$$K_{global}(i, j) = \sum_{m=1}^{N_{elem}} KE_m(i, j), \text{ stiffness assembly}$$

$$f_{global}(i, j) = \sum_{m=1}^{N_{elem}} f_m^{(e)}(i, j), \text{ force assembly}$$

$$K_{global} U = f_{global}, \text{ solver eqation}$$

where $\hat{\varepsilon}$ is element engineering strain, $\overline{B}$ is strain-displacement matrix, $\hat{u}$ is the element displacement, KE is element stiffness matrix, $f^{(e)}$ is element force vector, $\varepsilon_{thermal}$ is the thermal shrinkage strain, $K_{global}$ is the global assembled stiffness matrix, $f_{global}$ is the global assembled force vector.

The structural solver module 208 may solve the above equations for each voxel layer in the part geometry and accumulate distortion and residual stresses after each layer solution.

Figure 5:
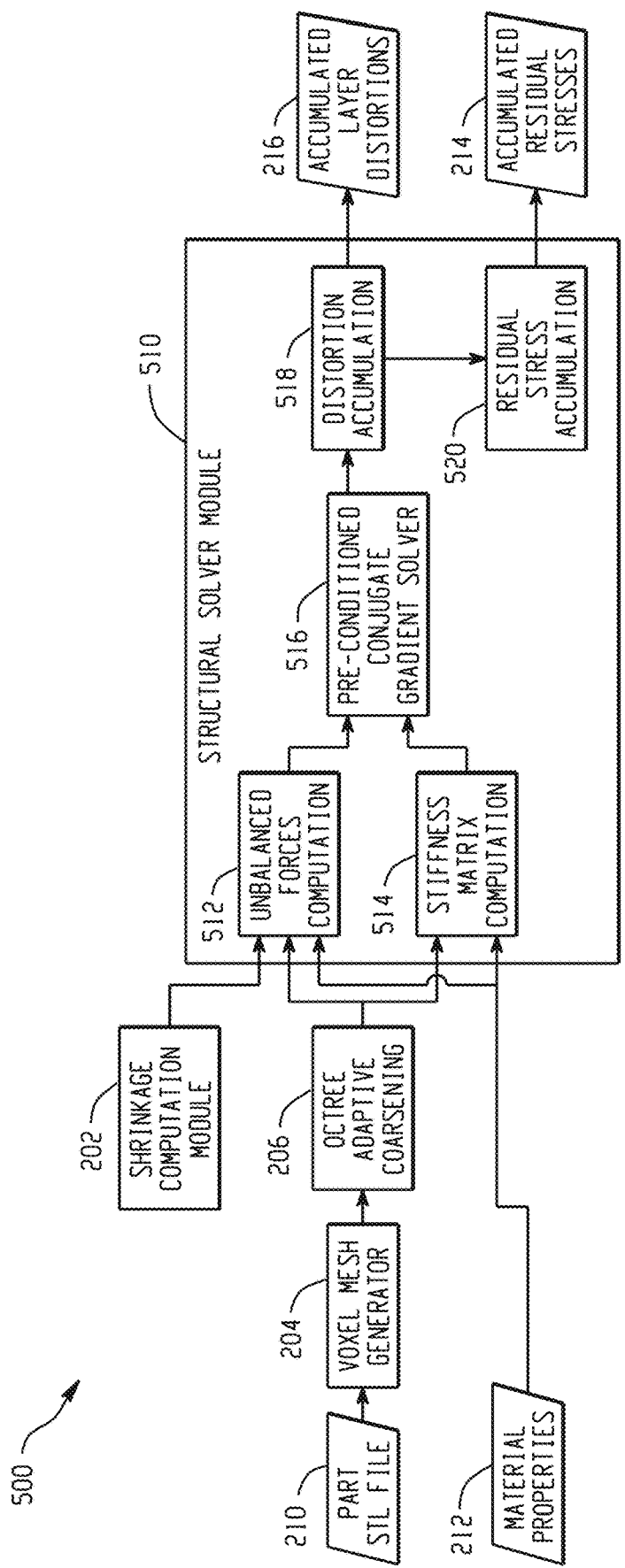
FIG. 5 is a block diagram of another example system for performing a simulation and structural analysis of an additive manufacturing process.

FIG. 5 is a block diagram 500 showing further details of an example structural solver module 510. In the illustrated example, the structural solver module 510 includes an unbalanced forces computation module 512, a stiffness matrix computation module 514, a pre-conditioned conjugate gradient solver 516, a distortion accumulation module 518, and a residual stress accumulation module 520, each of which may, for example, be implemented by software stored on one or more computer-readable medium and executed by one or more processors.

The unbalanced forces computation module 512 receives the thermal (shrinkage) data from the shrinkage computation module 202 as well as the octree mesh 206 and material properties data 212, and determines the unbalanced force, $f_{global}$, at each voxel layer of the part geometry. The unbalanced force, $f_{global}$, for the current voxel layer may, for example, be determined by solving for $f_{global}$ in the equations detailed above with reference to the structural solver module 208 in FIG. 2, as follows:

$$f_{global}(i, j) = \sum_{m=1}^{N_{elem}} f_m^{(e)}(i, j), \text{ force assembly}$$

The stiffness matrix computation module 514 receives the coarsened part geometry from the octree adaptive coarsening module 206 and the material properties data 212, and generates a stiffness matrix that is updated with each added voxel layer of the part geometry. The stiffness matrix, $K_{global}$, for the current layer may, for example, be determined by solving for $K_{global}$ in the equations detailed above with reference to the structural solver module 208 in FIG. 2, as follows:

$$K_{global}(i, j) = \sum_{m=1}^{N_{elem}} KE_m(i, j), \text{ stiffness assembly}$$

Known finite element programs typically calculate the stiffness of each element in the mesh and assemble them into the global stiffness matrix to allow for varying shapes and sizes of mesh elements. In contrast to other known methods, the stiffness matrix computation module 514 may be configured to restrict the sizes and shapes of the elements in a predetermined fashion. In this way, the global stiffness matrix does not need to calculate a new local stiffness for each element. Rather, the stiffness matrix computation module 514 may reuse the precomputed element stiffnesses (KE) calculated before the layer solution begins.

As the part geometry grows during additive manufacturing simulation, the number of degrees of freedom also grows, and the stiffness matrix grows dramatically. The octree adaptive coarsening module 206, described above, reduces the degrees of freedom to be solved. Known finite element analysis (FEA) software calculate stiffness using the so-called "birth and death" approach, where the stiffness matrix is assembled once and the rows and columns pertaining to the succeeding layers are deactivated. This known approach requires the full global stiffness matrix to be calculated at each layer deposition. In contrast, the stiffness matrix computation module 514 may produce a stiffness matrix which contains only the degrees of freedom of the voxel layers beneath the current layer. The matrix is updated at each voxel layer efficiently by reusing existing rows and columns in which the stiffness does not need to be modified. An illustration of the methodology employed by the stiffness matrix computation module 514 is illustrated in FIG. 6.

Figure 6C:
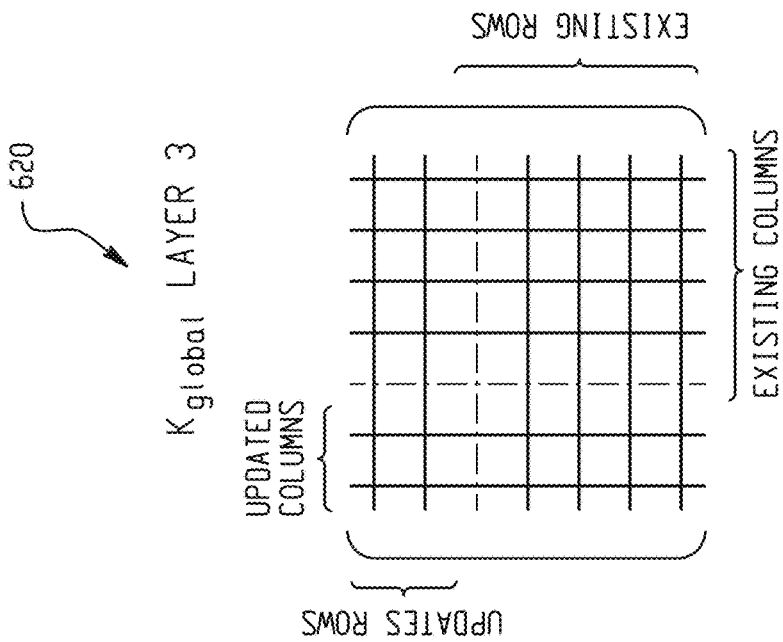
FIG. 6A-6C are diagrams illustrating the creation of an example global stiffness matrix.
Figure 6B:
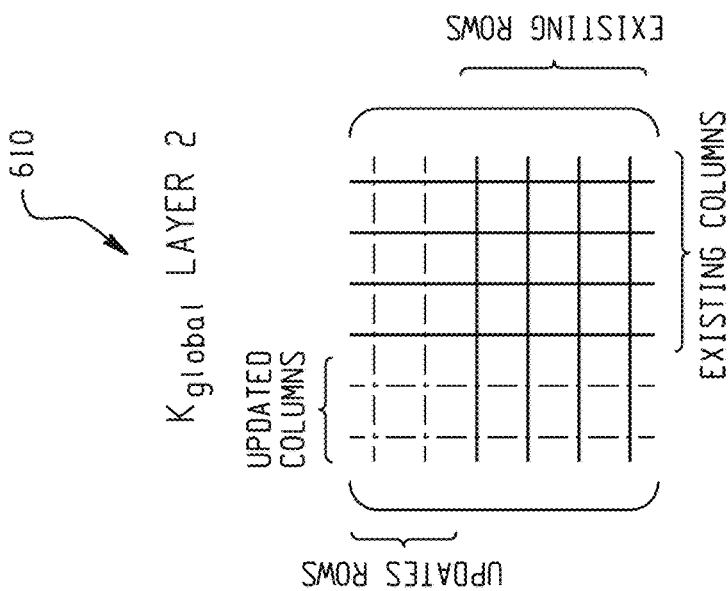
Figure 6A:
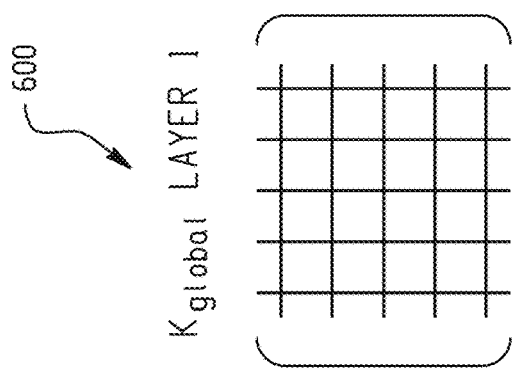

FIG. 6 shows an example of stiffness matrices 600, 610, 620 generated for three voxel layers of an example part geometry using the above-described method. As shown by the left-most diagram in FIG. 6, a first stiffness matrix 600 is generated for voxel layer 1 of the part geometry that includes 5 rows and five columns. As more layers are deposited and the part grows, more degrees of freedom are added to the stiffness matrix. For example, for the second voxel layer of the part geometry, a second stiffness matrix 610 is generated by reusing the first 4 rows and columns from layer 1, and replacing the fifth row and column with two new rows and columns—creating a stiffness matrix 610 with 6 rows and columns. Similarly, for the third voxel layer in the illustrated example, a stiffness matrix 620 is created by reusing the first 5 rows and columns from layer 2, and replacing the sixth row and column with two new rows and columns—creating a stiffness matrix 620 with 7 rows and columns.

With reference again to FIG. 5, the pre-conditioned conjugate gradient solver 516 receives the stiffness matrix computation and unbalanced forces computation for each successive voxel layer of the part geometry and determines the layer distortion, $U_{layer}$. The distortion for the current voxel layer may, for example, be determined by solving for U in the equations detailed above with reference to the structural solver module 208 in FIG. 2, for example follows:

$$K_{global} U_{layer} = f_{global} \Rightarrow U_{layer} = inv(K_{global}) \times f_{global}$$

The distortion accumulation module 518 receives the layer distortion, $U_{layer}$, from the pre-conditioned conjugate gradient solver 516, and accumulates the layer distortion, such that a total accumulated layer distortion 216 is determined for the entire part geometry. The accumulated layer distortions 216 may, for example, be determined by the distortion accumulation module 518 as follows:

$$U_{cummulative} = U_{cummulative} + U_{layer}$$

The residual stress accumulation module 520 receives the accumulated distortion and may determine the residual stress, a, for each voxel layer of the part geometry. The residual stress, a, for the current layer may, for example, be determined by solving for a in the following differential equations described above with reference to the structural solver module 208 in FIG. 2:

Equilibrium Equation: $\nabla\sigma + b = 0$, $\sigma$: internal stresses, b: body forces;

Strain Displacement Equation:

$$\varepsilon = \frac{1}{2}(\nabla u^T + \nabla u),$$

E: engineering strain, u: distortion;

Constitutive Equation: $\sigma = C\varepsilon$, C: material constitutive matrix

The residual stress accumulation module 520 calculates, $\sigma$, for each voxel layer of the part geometry, and accumulates the residual stresses, such that a total accumulated residual stress 214 is determined for the entire part geometry. The accumulated residual stresses 214 may, for example, be determined by the residual stress accumulation module 520 as follows:

$$\sigma_{cummulative} = \sigma_{cummulative} + \sigma$$

Figure 7:
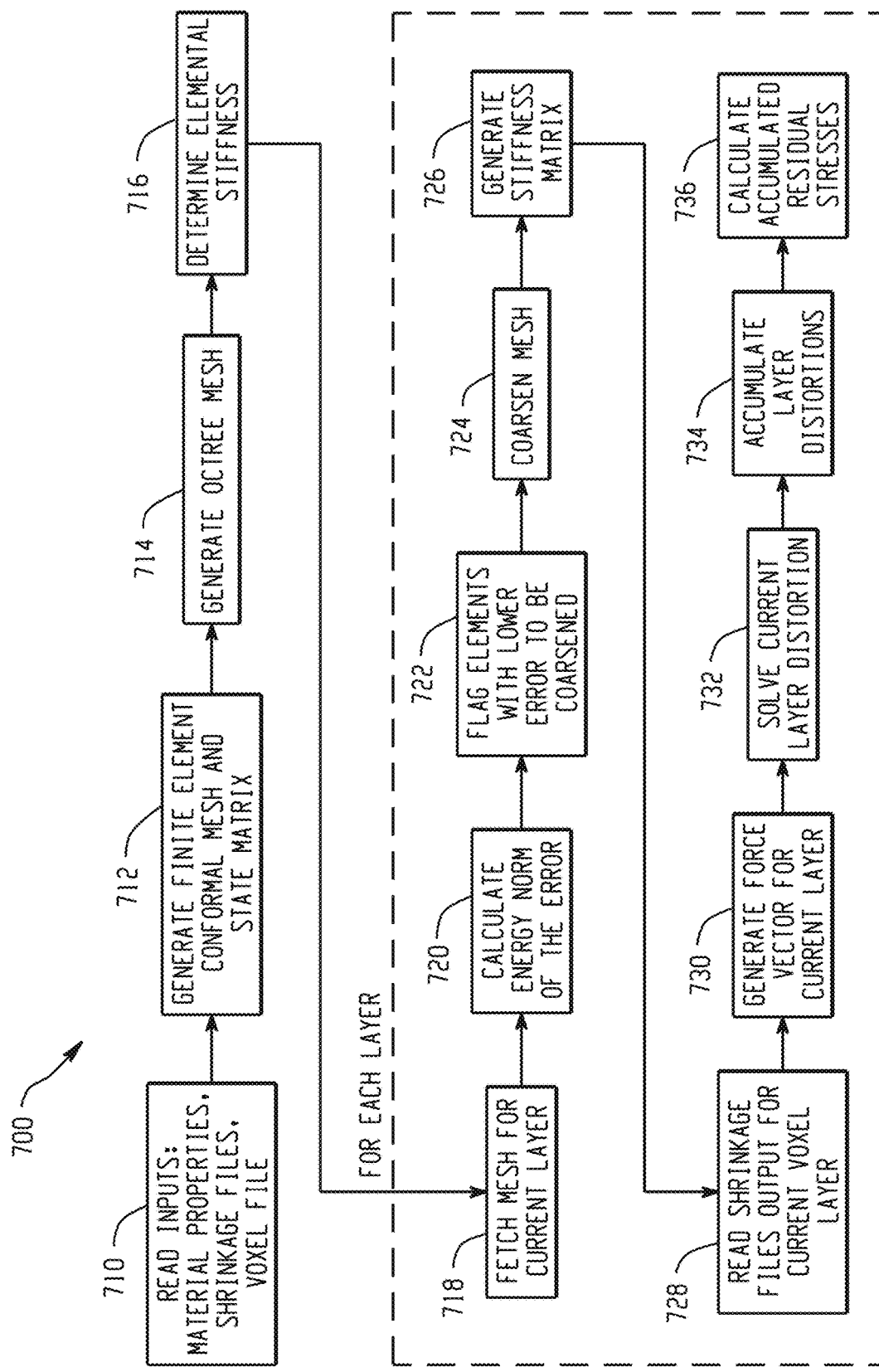
FIG. 7 is a flow diagram of an example method for performing a simulation and structural analysis of an additive manufacturing process.

FIG. 7 is a flow diagram of an example method 700 for performing a simulation and structural analysis of an additive manufacturing process. The steps of the example method 700 may, for example, be performed by one or more software applications stored on one or more non-transitory computer-readable medium and executed by one or more processors.

At step 710, inputs are read by one or more processors, including, for example, material properties data, thermal analysis data (e.g., shrinkage files), and design information for the part geometry (e.g., a voxel file). As detailed above, material properties data and design information may be provided by a user, and the thermal analysis data (e.g., shrinkage files) may, for example, be generated using one or more of the systems and methods described in commonly-owned U.S. Provisional Patent Application No. 62/586,793, titled "Systems and Methods for Performing Thermal Solving for Simulation and Implementation of Additive Manufacturing Process," which is incorporated herein by reference.

At step 712, the voxel file is parsed and used to generate a finite element conformal mesh. A state matrix is also generated to indicate the state of the material, such as part solid or support solid. An octree mesh is then generated at step 714 using the finite element mesh and state matrix as inputs. The octree mesh may, for example, be created as an object class with arrays of data that include one or more of the following (or similar) parameters: parent (identifying the parent of a given octant in the tree), level (identifying which level is the given octant positioned in the tree), positionInLevel (identifying the horizontal position of the octant at the current level), ElementNum (identifying the number of finite element mesh element number), coarsenFlag (a flag indicating the possibility of coarsening a given octant), and elementFlag (a flag indicating the existence of the given octant as a mesh element).

At step 716, an elemental stiffness matrix, KE, is generated, e.g., for one voxel element. The elemental stiffness matrix, KE, may, for example, be determined by solving for KE in the equations detailed above with reference to the structural solver module 208 in FIG. 2, for example as follows:

$$KE = \int_\Omega \overline{B}^T C \overline{B} dV, \text{Element Stiffness Matrix}$$

Steps 718-736 are then repeated for each layer of the deposition process, as indicated by the dotted box in FIG. 7, to accumulate the layer distortions (Step 734) and calculate the accumulated residual stresses (Step 736) for the part geometry. At step 718, the mesh for the current layer is fetched from the octree mesh. The energy norm of the error is then calculated at step 720, for example as:

$$\|e\|_{L_2} = \left[\int_\Omega (\sigma - \hat{\sigma})^T (\sigma - \hat{\sigma}) d\Omega\right]^{1/2},$$

where $L_2$ is Euclidean norm, $\sigma$ is internal stresses, e is error, and $\Omega$ is domain of computation.

At step 722, elements with an error that is below a predetermined threshold, such as a relative error of 1E-6, are flagged to be coarsened. The mesh is then coarsened at step 724, for example by traversing the octree and collapsing from the bottom up when all octants of the parent are flagged to coarsen.

At step 726, a stiffness matrix is generated with a number of rows and columns equal to the degree of freedom below the current layer, for example as described above with reference to FIGS. 5 and 6. At step 728, the thermal analysis data (e.g., shrinkage file(s)) that coincide with the current voxel layer are read (from the inputs provided at step 710.) A force vector, $f_{global}$, is generated for the current layer at step 730. The current layer distortion, $U_{layer}$, may then be determined at step 732, for example as:

$$K_{global} U_{layer} = f_{global} \Rightarrow U_{layer} = inv(K_{global}) \times f_{global}$$

At step 734, the layer distortion for the current layer is accumulated, such that a total accumulated layer distortion is determined upon completion of steps 718-734 for each voxel layer of the part geometry. In addition, the residual stress, a, may be similarly accumulated at step 736 to determine a total accumulated residual stress upon completion of steps 718-736 for each voxel layer of the part geometry.

Following below is another example of a process flow for performing a simulation and structural analysis of an additive manufacturing process.

Read inputs: material properties, shrinkage files for all layers, voxel file

Parse voxel file and call mesh_creater function to create a finite element conformal mesh. Also create a state matrix to indicate state of the material such as part solid or support solid.

FEA Mesh←mesh_creater(voxel_data)

Call OctreeMeshGen function with inputs as finite element mesh and state matrix. OctreeMesh creates an object class with arrays of data including parent: parent of a given octant in the tree, level: which level is the given octant positioned in the tree, positionInLevel: horizontal position of the octant at the current level, ElementNum: number of finite element mesh element number, coarseFlag: flag indicating possibility of coarsening a given octant, elementFlag: flag indicating the existence of the given octant as a mesh element.

(parent, positionInLevel, ElementNum, coarseFlag, elementFlag) OctreeMeshGen(FEA Mesh)
  Generate Element Stiffnesses KE←elemStiffGen(matProp,voxel_size)

For layer=1 to numLayers do
  1) Mesh for the current layer is fetched from the whole mesh.

layer_mesh←fetchLayerMesh(OctreeMesh,layer)

Calculate energy norm of the error $$\|e\|_{L_2} = \left[ \int_\Omega (\sigma - \hat{\sigma})^T (\sigma - \hat{\sigma}) d\Omega \right]^{\frac{1}{2}}$$

2) Flag the elements with lower error to be coarsened true←coarseFlag(error<threshold)

3) Coarsen the mesh by traversing the octree and collapsing from bottom up when all octants of parent are flagged to coarsen OctreeMesh←meshCoarsen(coarsenFlag,OctreeMesh)

4) Additive Global Stiffness Assembly Procedure. Use the method described above to generate stiffness matrix with number of rows and columns equal to the degree of freedom below the current layer $KE_{global}$←additive_global_stiffness_assembler(KE, layer,OctreeMesh)

5) Read the shrinkage files output from the thermal solver which coincide with the current voxel layer.

voxelLayerShrinkage←getShrinkageForVoxels(shrinkageInput,layer)

6) Generate force vector for the current layer $f_{global}$←forceGen(voxelLayerShrinkage,OctreeMesh, layer)

7) Solve current layer distortion $K_{global}U_{layer}=f_{global} \Rightarrow U_{layer}=inv(K_{global}) \times f_{global}$ 8) Accumulate layer distortions $U_{cummulative}=U_{cummulative}+U_{layer}$ 9) Calculate the accumulated residual stresses $\sigma_{cummulative}$←calculateStresses(OctreeMesh, $U_{cummulative}$)

End For

The accumulated distortion, $U_{cummulative}$, and residual stresses, $U_{cummulative}$, resulting from the above process may, for example, be written to result files in a nontransitory storage medium after each layer. These result files will include rich data that may be post-processed in various toolboxes, examples of which are shown in FIG. 8.

Figure 8:
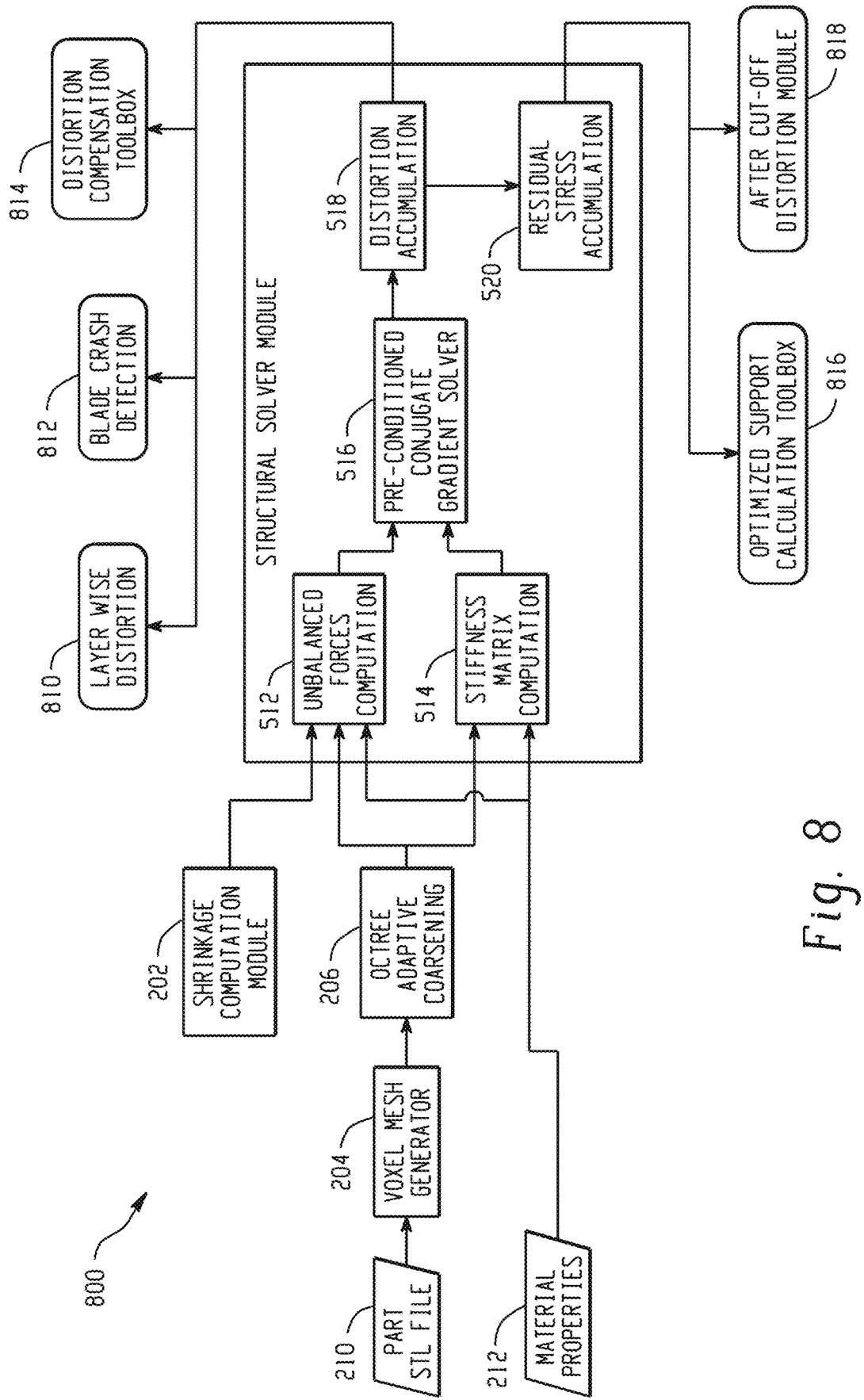
FIG. 8 is a block diagram of another example system for performing a simulation and structural analysis of an additive manufacturing process along with examples of various toolboxes that may utilize the results obtained from the simulation.

FIG. 8 is a block diagram 800 depicting example applications for the accumulated layer distortion and residual stresses data that is determined using the systems and methods described above. The illustrated example 800 includes a layer-wise distortion toolbox 810, a blade crash detection toolbox 812, a distortion compensation toolbox 814, an optimized support calculation toolbox 816, and an after cut-off distortion module toolbox 818, each of which may, for example, be implemented by software stored on one or more computer-readable medium and executed by one or more processors.

Figure 9B:
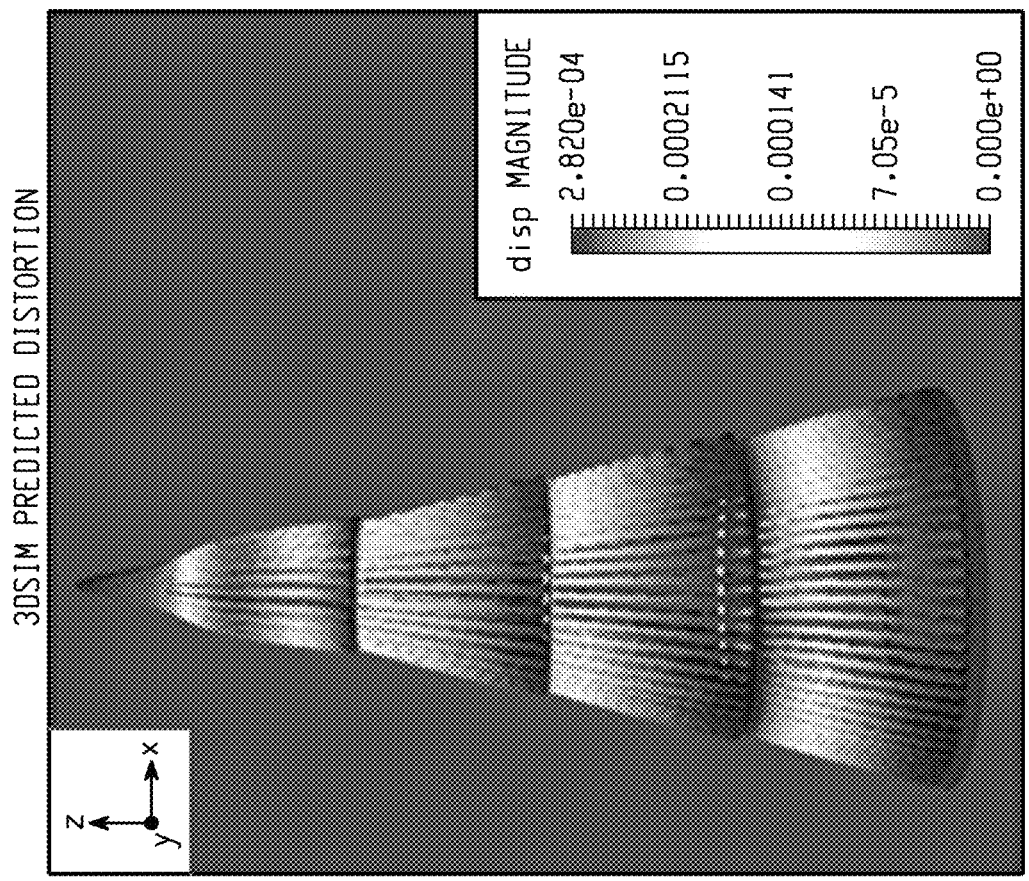
FIGS. 9A and 9B show diagrams depicting an example simulation and structural analysis of a geometry made by an additive manufacturing process.
Figure 9A:
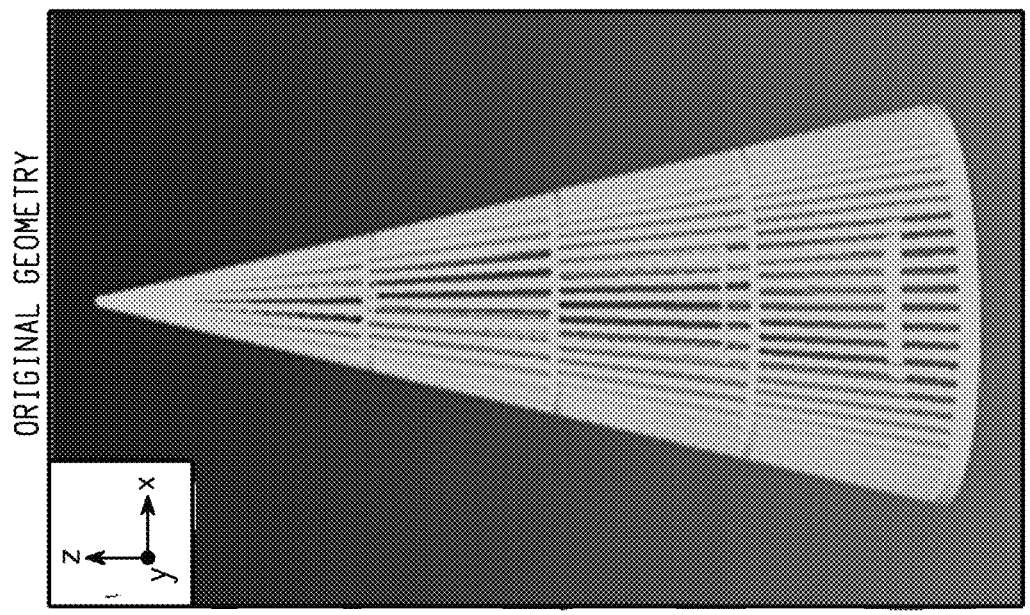

The layer-wise distortion toolbox 810 may be configured to view the predicted distortion of the part geometry on a layer-by-layer basis. For example, as the voxels are deposited, the accumulated distortion, $U_{accumulated}$, at each voxel layer may be output to the layer wise distortion toolbox 810 and stored to one or more files. This layer-wise distortion information may, for example, be used to create displays for a user to visualize how the part geometry becomes distorted with each deposited layer. An example display that may be created by the layer-wise distortion module 810 is depicted at FIG. 9. In the example shown in FIG. 9, the part image shown on the right-hand side of the figure depicts the distortion at each voxel layer. In an embodiment, the layer-wise distortion for the geometry could be displayed in a successive fashion to present the user with a movie-like display showing how the distortion will likely accumulate during additive manufacturing.

With reference again to FIG. 8, the blade crash detection module 812 may be configured to provide a warning if distortion of the part geometry is likely to cause a blade crash incident in the additive manufacturing system. For example, at each layer deposition during an additive manufacturing process, distortion may cause the part to curl upwards in the direction of the powder deposition mechanism (referred to as the blade.) The blade crash detection module 812 may thus use the accumulated layer distortion data to predict if distortion in a part geometry is likely to cause it to curl up above the thickness of the layer being deposited, causing the blade to crash into the part.

Figure 10B:
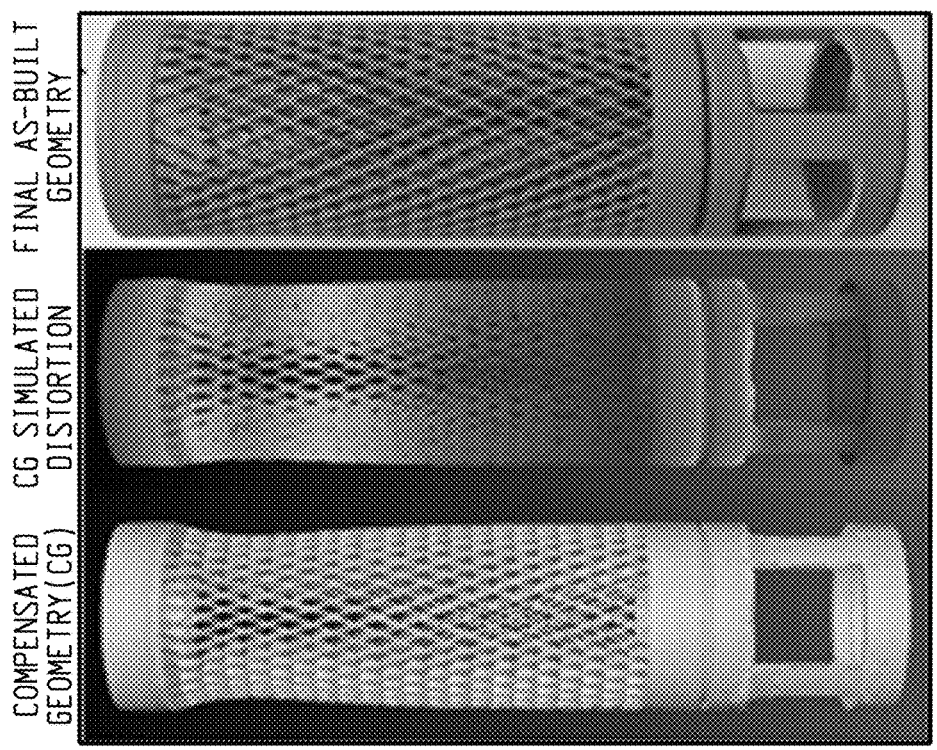
FIGS. 10A and 10B show diagrams depicting results of an example simulation and structural analysis of a geometry made by an additive manufacturing process.
Figure 10A:
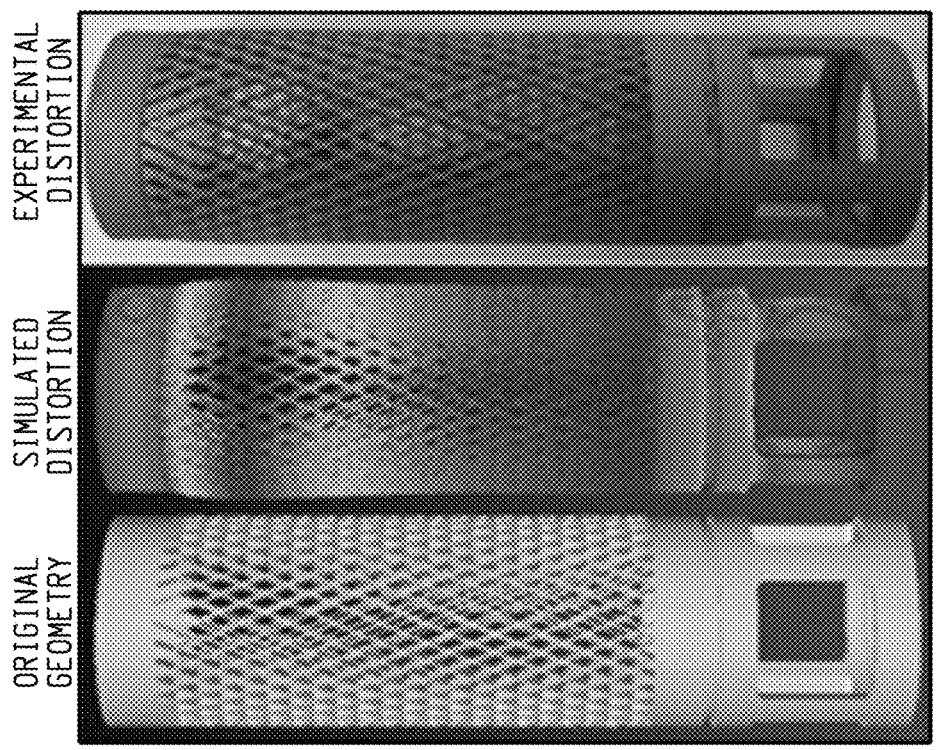

The distortion compensation toolbox 814 may be configured to use the accumulated layer distortion data to modify the part geometry by an equal amount of distortion in an opposite direction. In this way, when the modified part geometry is built using the additive manufacturing process, the predicted distortion should cause the modified part geometry to be distorted into the desired part geometry. An example is illustrated in FIG. 10. The left-hand side of FIG. 10 shows a part geometry and the simulated and experimental distortion resulting from creating the part geometry with an additive manufacturing process. Using this simulated distortion, the distortion compensation toolbox 814 may create a compensated geometry, as shown on the right-hand side of FIG. 10, which has an equal distortion in the opposite direction. As shown, the final part created from the compensated geometry should then match the desired geometry of the original part.

With reference again to FIG. 8, the optimized support calculation toolbox 816 may be configured to help a designer minimize the amount of material used for support structures in an additive manufactured part. As explained above, support structures may be added to the part geometry if one or more parts of the geometry may not be able to support itself during the additive manufacturing process (e.g., where bottom facing voxels of the geometry have a surface angle less than 45%). The optimized support calculation toolbox 816 may utilize the accumulated residual stress data at interfaces of the support structures to determine a minimum size for the structures that will adequately support the part geometry.

Figure 11A:
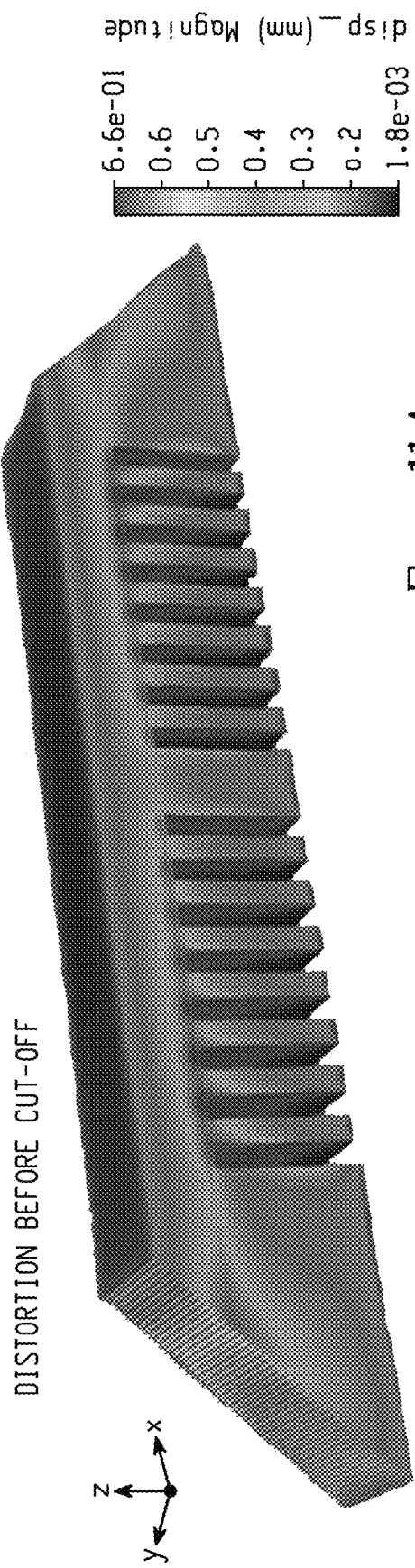
FIGS. 11A and 11B show diagrams depicting an example simulation of cut-off distortion resulting from an additive manufacturing process.
Figure 11B:
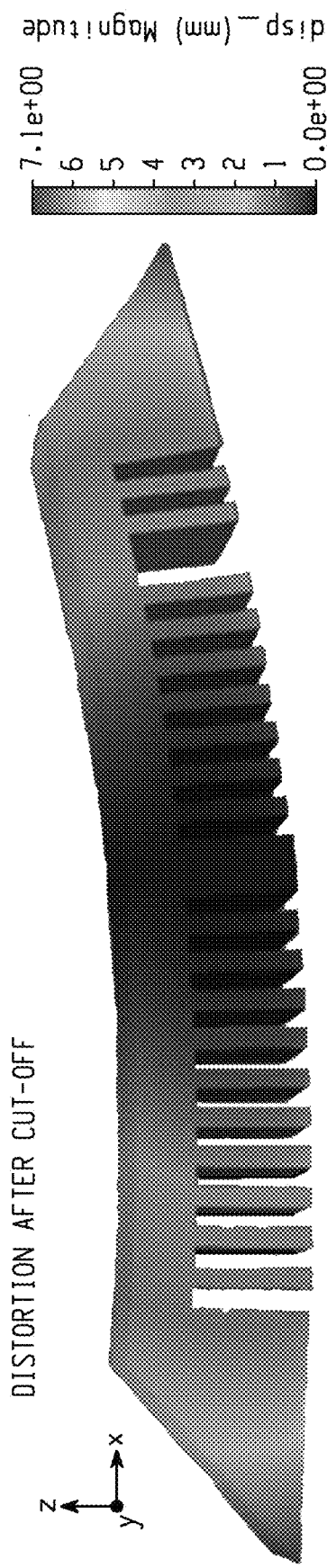

The after cut-off distortion module 818 may be configured to predict the distortion of a part geometry after it has been separated from the base plate used during additive manufacturing. During a typical additive manufacturing process, the part geometry is created on a base plate, and becomes fused to the base plate. When the completed part is cut from the base plate, residual stresses in the part often cause the part to become more distorted. As example of this is illustrated in FIG. 11. The after cut-off distortion module 818 may utilize the accumulated residual stress data to predict how much the completed part will distort when cut from its base plate.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes (e.g., the structural distortion in a part geometry created by an additive manufacturing process). The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The methods and systems described herein may be implemented using any suitable processing system with any suitable combination of hardware, software and/or firmware, such as described below with reference to the non-limiting examples of FIGS. 12, 13A, 13B and 13C.

Figure 12:
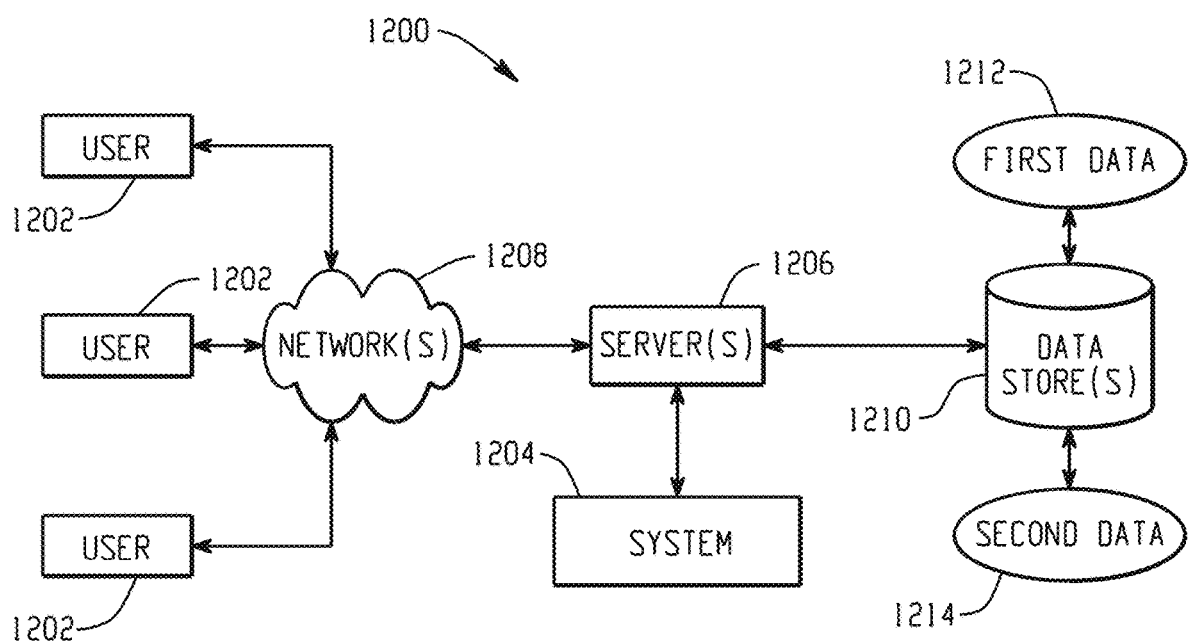
FIGS. 12, 13A, 13B, and 13C depict example systems that may be used to implement the technology disclosed herein.

FIG. 12 depicts at 1200 a computer-implemented environment wherein users 1202 can interact with a system 1204 hosted on one or more servers 1206 through a network 1208.

The system 1204 contains software operations or routines. The users 1202 can interact with the system 1204 through a number of ways, such as over one or more networks 1208. One or more servers 1206 accessible through the network(s) 1208 can host system 1204. It should be understood that the system 1204 could also be provided on a stand-alone computer for access by a user.

Figure 13A:
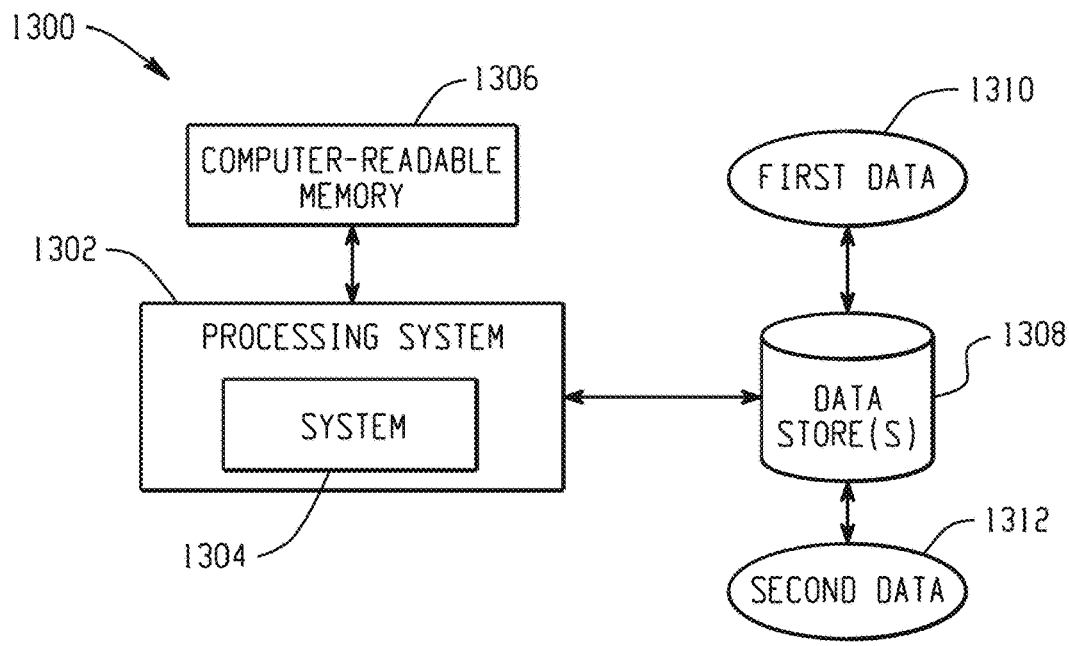
Figure 13B:
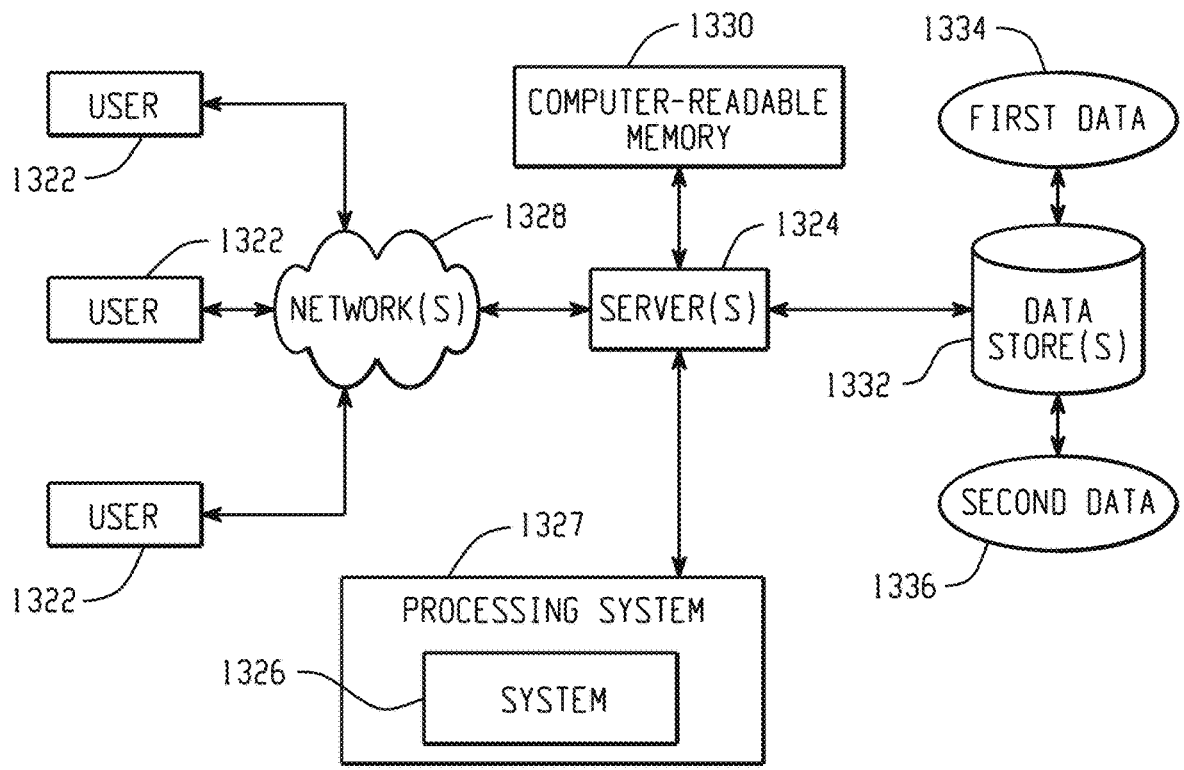
Figure 13C:
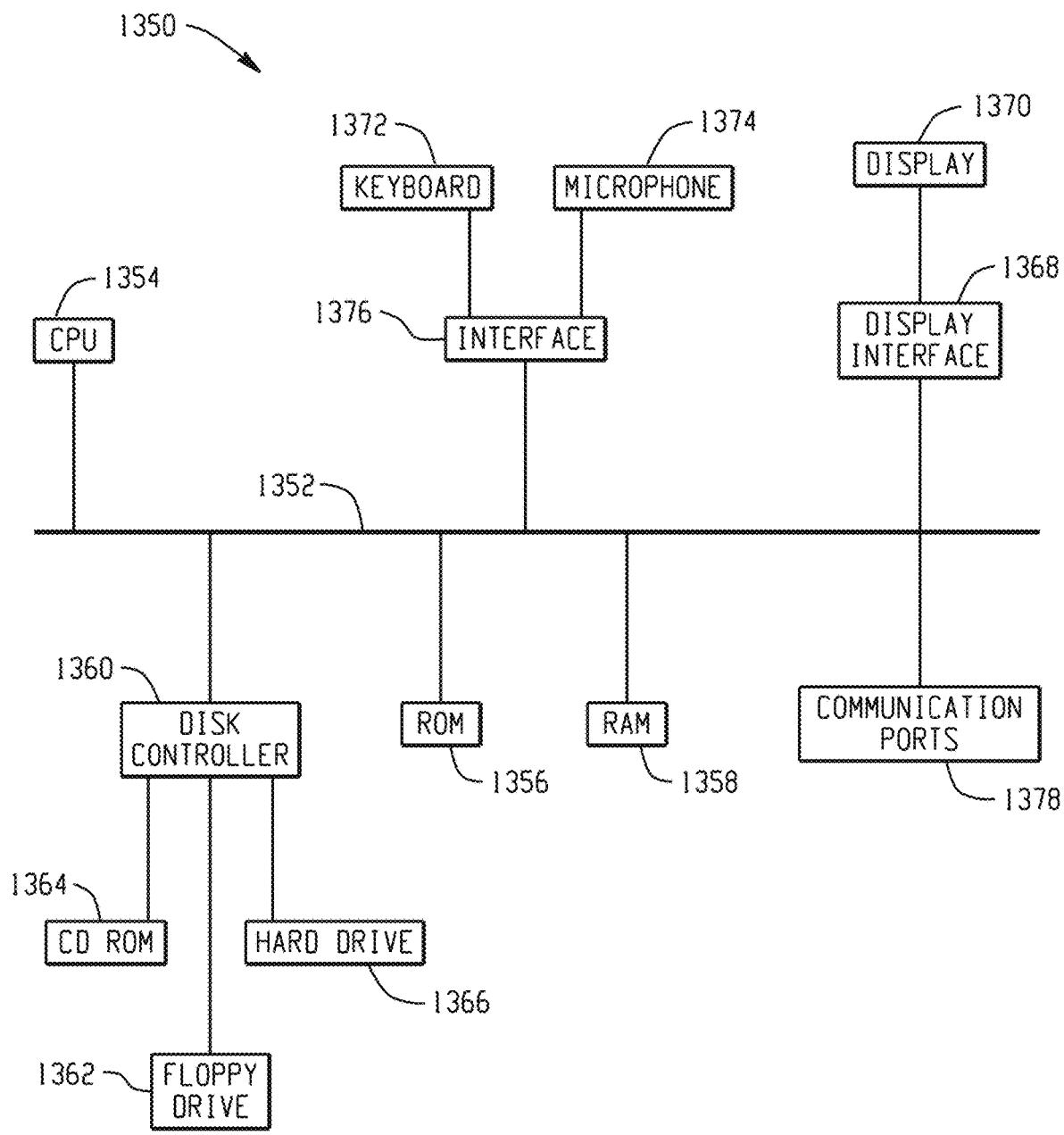

FIGS. 13A, 13B, and 13C depict example systems for use in implementing a system. For example, FIG. 13A depicts an exemplary system 1300 that includes a standalone computer architecture where a processing system 1302 (e.g., one or more computer processors) includes a system 1304 being executed on it. The processing system 1302 has access to a non-transitory computer-readable memory 1306 in addition to one or more data stores 1308. The one or more data stores 1308 may contain first data 1310 as well as second data 1312.

FIG. 13B depicts a system 1320 that includes a client server architecture. One or more user PCs 1322 accesses one or more servers 1324 running a system 1326 on a processing system 1327 via one or more networks 1328. The one or more servers 1324 may access a non-transitory computer readable memory 1330 as well as one or more data stores 1332. The one or more data stores 1332 may contain first data 1334 as well as second data 1336.

FIG. 13C shows a block diagram of exemplary hardware for a standalone computer architecture 1350, such as the architecture depicted in FIG. 13A, that may be used to contain and/or implement the program instructions of system embodiments of the present disclosure. A bus 1352 may serve as the information highway interconnecting the other illustrated components of the hardware. A processing system 1354 labeled CPU (central processing unit) (e.g., one or more computer processors), may perform calculations and logic operations required to execute a program. A non-transitory computer-readable storage medium, such as read only memory (ROM) 1356 and random access memory (RAM) 1358, may be in communication with the processing system 1354 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1360 interfaces one or more disk drives to the system bus 1352. These disk drives may be external or internal floppy disk drives such as 1362, external or internal CD-ROM, CD-R, CD-RW or DVD drives such as 1364, or external or internal hard drives 1366.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1356 to be displayed on a display 1370 in audio, graphic, or alphanumeric formal. Communication with external devices may occur using various communication ports 1378.

In addition to the standard computer-type components, the hardware may also include data input devices, such as a keyboard 1372, or other input device 1374, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The technology described herein may provide certain advantages over known systems, some of which are detailed herein. It should be understood, however, that other advantages, in addition to those expressly detailed herein, may also be possible.

It is claimed:

1. A computer-implemented method for providing a digital computer simulation predicting structural distortion created by an additive manufacturing process in a part geometry, the method comprising:
    initializing one or more models to represent structural distortion in the part geometry created by the additive manufacturing process;
    simulating, using the one or more initialized models, the structural distortion the part geometry by:
        generating an octree mesh for the part geometry based on a voxel file having voxel layers;
        coarsening the octree mesh by combining one or more elements of the octree mesh;
        generating a representation of stiffness for one of the voxel layers based on the coarsened octree mesh;
        determining a force vector based, at least in part, on the coarsened octree mesh and data from a thermal analysis of the part geometry; and
        determining a layer distortion based on the force vector and the representation of stiffness; and
    predicting structural distortion in the part geometry based on the layer distortion.

2. The method of claim 1, further comprising:
    displaying, on a display, a visual representation of the part geometry; and
    displaying, on the display, the predicted structural distortion as applied to the visual representation of the part geometry.

3. The method of claim 1, further comprising:
    detecting a potential blade crash incident between the part geometry and a powder deposition mechanism; and
    providing a signal indicating the potential blade crash incident.

4. The method of claim 1, further comprising modifying the part geometry to offset the predicted structural distortion.

5. The method of claim 1, further comprising:
    calculating residual stresses for each voxel layer; and
    accumulating the residual stresses of each voxel layer.

6. The method of claim 5, further comprising:
    adding one or more support structures to the part geometry; and
    minimizing an amount of material used for the one or more support structures based, in part, on the accumulated residual stresses at interfaces of the one or more support structures.

7. The method of claim 5, further comprising predicting additional distortion of the part geometry after separation from a base plate, wherein the predicting is based, in part, on the accumulated residual stresses of each voxel layer.

8. The method of claim 1, wherein the voxel file provides a uniform grid of elements for the part geometry.

9. The method of claim 1, wherein generating the octree mesh comprises:
    defining a bounding box for the part geometry;
    dividing the bounding box into a first set of octants;
    for octants of the first set that are not completely solid or completely empty, sub-dividing those octants into second sets of octants; and
    repeating sub-dividing octants that are not completely solid or completely empty into additional sets of octants until all octants are uniform.

10. The method of claim 1, wherein the representation of stiffness represents degrees of freedom of one of the voxel layers.

11. A computer-implemented system for providing a digital computer simulation predicting structural distortion created by an additive manufacturing process in a part geometry comprising:
    one or more data processors; and
    one or more computer-readable storage mediums encoded with instructions for commanding the one or more data processors to execute steps that include:
        initializing one or more models to represent structural distortion in the part geometry created by the additive manufacturing process;
        simulating, using the one or more initialized models, the structural distortion the part geometry by:
            generating an octree mesh for the part geometry based on a voxel file having voxel layers,
            coarsening the octree mesh by combining one or more elements of the octree mesh,
            generating a representation of stiffness for one of the voxel layers based on the coarsened octree mesh,
            determining a force vector based, at least in part, on the coarsened octree mesh and data from a thermal analysis of the part geometry,
            determining a layer distortion based on the force vector and the representation of stiffness, and
        predicting structural distortion in the part geometry based on the layer distortion.

12. The system of claim 11, further comprising one or more computer-readable storage mediums encoded with instructions for commanding the one or more data processors to execute steps that further include:
    displaying, on a display, a visual representation of the part geometry; and
    displaying, on the display, the predicted structural distortion as applied to the visual representation of the part geometry.

13. The system of claim 11, further comprising one or more computer-readable storage mediums encoded with instructions for commanding the one or more data processors to execute steps that further include:
    detecting a potential blade crash incident between the part geometry and a powder deposition mechanism; and
    providing a signal indicating the potential blade crash incident.

14. The system of claim 11, further comprising one or more computer-readable storage mediums encoded with instructions for commanding the one or more data processors to execute steps that further include:
    modifying the part geometry to offset the predicted structural distortion.

15. The system of claim 11, further comprising one or more computer-readable storage mediums encoded with instructions for commanding the one or more data processors to execute steps that further include:
    calculating residual stresses for each voxel layer; and
    accumulating the residual stresses of each voxel layer.

16. The system of claim 15, further comprising one or more computer-readable storage mediums encoded with instructions for commanding the one or more data processors to execute steps that further include:
  adding one or more support structures to the part geometry; and
  minimizing an amount of material used for the one or more support structures based on the accumulated residual stresses at interfaces of the one or more support structures.

17. The system of claim 15, further comprising one or more computer-readable storage mediums encoded with instructions for commanding the one or more data processors to execute steps that further include:
  predicting additional distortion of the part geometry after separation from a base plate, wherein the predicting is based, in part, on the accumulated residual stresses of each voxel layer.

18. A non-transitory computer-readable storage medium comprising instructions for providing a digital computer simulation predicting structural distortion created by an additive manufacturing process in a part geometry which when executed cause a processing system to execute operations comprising:
  initializing one or more models to represent structural distortion in the part geometry created by the additive manufacturing process;
  simulating, using the one or more initialized models, the structural distortion the part geometry by:
    generating an octree mesh for the part geometry based on a voxel file having voxel layers;
    coarsening the octree mesh by combining one or more elements of the octree mesh;
    generating a representation of stiffness for one of the voxel layers based on the coarsened octree mesh;
    determining a force vector based, at least in part, on the coarsened octree mesh and data from a thermal analysis of the part geometry;
    determining a layer distortion based on the force vector and the representation of stiffness; and
    predicting structural distortion in the part geometry based on the layer distortion.

19. The non-transitory computer-readable storage medium of claim 18, further comprising instructions for which when executed cause a processing system to execute operations further comprising:
  displaying, on a display, a visual representation of the part geometry; and
  displaying, on the display, the predicted structural distortion as applied to the visual representation of the part geometry.

20. The non-transitory computer-readable storage medium of claim 18, further comprising instructions for which when executed cause a processing system to execute operations further comprising:
  calculating residual stresses for each voxel layer; and
  accumulating the residual stresses of each voxel layer.

* * * * *